United States Patent [19]

Mancuso et al.

[11] Patent Number: 4,702,359
[45] Date of Patent: Oct. 27, 1987

[54] TORQUE OVERLOAD RELEASE CLUTCH

[75] Inventors: Jon R. Mancuso; Thomas G. Fromknecht, both of Erie, Pa.; Robert E. White, Conneaut, Ohio

[73] Assignee: Zurn Industries, Inc., Erie, Pa.

[21] Appl. No.: 825,357

[22] Filed: Feb. 3, 1986

[51] Int. Cl.$^4$ .......................... F16D 7/02; F16D 11/06
[52] U.S. Cl. ............................. 192/56 R; 192/114 R
[58] Field of Search .............. 192/56 R, 71, 79, 93 A, 192/114, 114 R

[56] References Cited

U.S. PATENT DOCUMENTS

| | | | |
|---|---|---|---|
| 998,615 | 7/1911 | Huneke | 192/56 R |
| 2,045,572 | 6/1936 | Dow | 192/114 X |
| 2,128,715 | 8/1938 | Reich | 192/56 R |
| 2,137,417 | 11/1938 | Schaefer | 192/56 R |
| 3,927,537 | 12/1975 | Anderson et al. | 192/56 R |
| 4,460,078 | 7/1984 | Heide et al. | 192/56 R |

FOREIGN PATENT DOCUMENTS

| | | | |
|---|---|---|---|
| 1201574 | 8/1970 | United Kingdom | 192/56 R |
| 586006 | 12/1977 | U.S.S.R. | 192/56 R |

Primary Examiner—Carl D. Friedman
Assistant Examiner—Richard E. Chilcot, Jr.
Attorney, Agent, or Firm—Charles L. Lovercheck; Wayne L. Lovercheck; Dale R. Lovercheck

[57] ABSTRACT

A torque overload release clutch is disclosed made up of a drive member and a driven member adapted to be connected between a power source and a load to transmit a torsional force and to release at a predetermined torque. The clutch release mechanism is made up of a plurality of spaced thermoplastic modules supported in the driven member and a plurality of spaced recesses in the drive member. The modules are each made up of a sleeve and a pin. The sleeve is supported on the driven member and it receives the pin. The pin has a first follower and a second follower member on it. The first follower engages the side of the recesses which acts as a cam and urges the pin toward the sleeve in proportion to the magnitude of the torsional force. The second follower engages a cam surface on the sleeve resisting the force that urges the pin toward the sleeve. When the torque reaches the predetermined magnitude, the second cam follower overcomes resistance of the sleeve and enter the sleeve which has an internal recess and thereby holds the pin from returning thereby releasing the coupling.

26 Claims, 5 Drawing Figures

TORQUE OVERLOAD RELEASE CLUTCH

SUMMARY OF THE INVENTION

The torque overload release clutch disclosed herein is intended to connect a drive member to a driven member to transmit torque and to release when the torque reaches a predetermined value. The clutch parts are connected by a series of openings in the drive member and a series of pin and sleeve modules made of thermoplastic material disposed on the driven member in a circle around the axis of rotation of the clutch. The modules are each made up of a hollow sleeve supported on the driven member and a pin slidably supported in the hollow resilent sleeve. The pins each have a rounded first end normally received in the recesses and a ring spaced from the first end. Each recess has an inclined end which engages the side of the pin and applies an axial force to the pins when torque is being transmitted which urges the pin toward the driven member. The pin has a follower surface on it which engages the inclined end of the sleeve. The follower may be in the form of a ring on the pin, a ring on the pin head, a bump on the side of the pin or even a rounded second side on an enlarged pin head. The sleeve has an inside diameter smaller than the outside diameter of the ring on the pin so that the ring or cam enters the sleeve when torque reaches the predetermined value, when sufficient torque is developed to force the rounded ends of the pin to move out of the recesses in the drive member against the counterforce of the ring deforming the sleeve, the ring is moved into the sleeve, thus releasing the clutch. After the ring has been forced into the sleeve, the pin must be reset manually or automated force, if desired, before the clutch will again transmit load. Resetting is done by manually pushing the pin toward the drive member. The torque release of a given clutch can be changed by providing a plurality of pin and sleeve modules and leaving some of the pins disengaged. To increase the release torque more of the pin modules can be engaged, or by changing one or more sleeves with sleeves with different inside diameters. FIGS. 2, 4 and 5 each show a sleeve having a different inside diameter at each end. These sleeves can be flipped over end for end and the end with the changed inside diameter can be used as the sleeve cam in engagement with the ring on the pin.

The recess in the first clutch member can be considered to be a first cam, the rounded pin end forms a first follower, the ring or the pin forms a second follower and the hollow sleeve can be considered to be a second cam.

In one embodiment of the invention, the ring is integral with the pin. In another embodiment of the invention, the ring is integral with the head of the pin and in still another embodiment of the invention, the pin head is rounded on both sides so that each side of the rounded head of the pin acts as a follower surface, one acted on by the drive member and the other restrained by the sleeve. The head of the pin may be larger than the pin or may the head may be the same size or it could even be smaller than the pin, if desired. The sleeves can be fixed to the driven clutch member or they can be freely movable between the pin head and a stop on the driven member.

In each of the embodiments the number of cams and followers assemblies used will depend on the size of the coupling and the magnitude of the torque to be transmitted by the coupling and other design requirements.

REFERENCE TO PRIOR ART

Applicant is aware of the following prior art: U.S. Pat. Nos. 4,927,537 and 4,199,964. This prior art does not contain a disclosure of the features claimed herein which gives the advantages that are available.

BACKGROUND OF THE INVENTION

Overload protection for power transmission equipment is necessary in order to prevent serious damage to costly equipment. Torque overload protection devices are available in three basic types: 1. Friction Clutches, 2. Shear Pin Clutches and 3. Detenting Clutches. Each type of clutch has certain disadvantages. Friction clutches are susceptible to variation in torque slippage setting because of changes in: wear, pressure, lubrication, temperature, moisture and coefficient of friction. Shear pin couplings may be used where overload torque occurs infrequently. They are accurate and reliable but require substantial downtime to maintain and replace pins. When the occurence of overload torque is frequent, the downtime can be costly. Detent clutches use various types of sliding wedge principles. Although they tend to be more accurate in torque release setting than friction clutches, they still are subjected to variation in friction that they sometimes "stick" instead of "slide", or are otherwise unpredictable. Torque overload release clutches of the general type disclosed herein are known in the art. Examples of such torque overload release clutches are shown in U.S. Pat. Nos. 4,927,537 to Anderson et al and 4,199,964 to Grey. These clutches were successful in the application for which they were intended but they had certain disadvantages. Disadvantages of existing modules—they have a relatively elaborate latching mechanism which lacks repeatability and is also expensive. This invention has greater repeatability and immune to variations in coefficient of friction. Also, it requires no lubrication therefore, it is more repeatable under longer periods of time since no lube break down to change sliding. This invention also consists of fewer parts and is less costly to make because of this. These clutches lacked repeatability in release torque and the clutch according to the present invention has considerably greater repeatability is less likely to stick and is more accurate in torque release setting than the clutch as referred to above.

OBJECTS OF THE INVENTION

It is an object of the invention to provide an improved torque overload release clutch.

Another object of the invention is to provide a torque overload release clutch that is simple in construction, economical to manufacture and simple and efficient to use.

Another object of the invention is to provide a torque overload release clutch that requires no lubrication.

Another object of the invention is to provide a torque overload release clutch that will not prematurely slip, is reusable and economical and its torque setting is repeatable.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

DETAILED DESCRIPTION OF DRAWINGS

Figure 1:
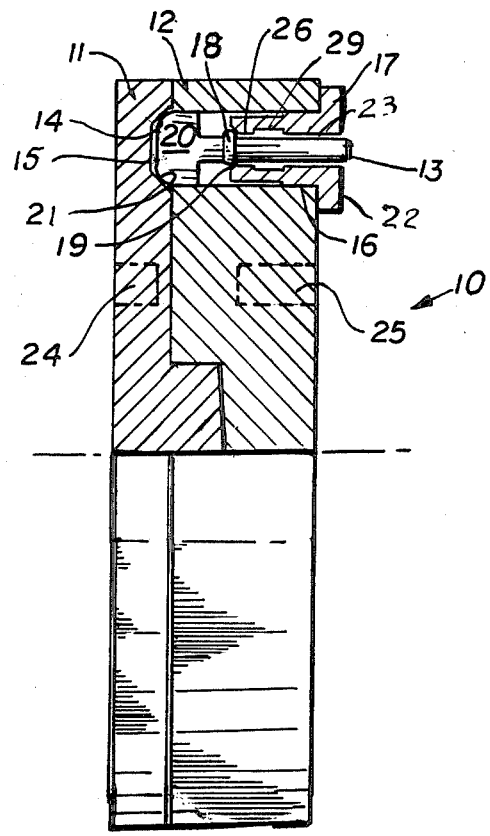
FIG. 1 is a partial diagramatic view partly in cross section of an embodiment of the invention.

Now with more particular reference to the drawings, four embodiments of the torque overload release clutch are disclosed as follows: (1) in FIGS. 1 and 3; (2) in FIG. 2; (3) in FIG. 4 and (4) in FIG. 5, by way of example. Each of these four embodiments have in common the thermoplastic modules that connect a drive member to a driven member. Each module is made up of a first cam on the drive member which could be an insert in a recess of suitable shapes, (it could be frustoconical, spherical, cylindrical or it could even be an external cam fixed to the drive member having a surface that inclines toward the driven member and outward) in the drive member having a single inclined cam surface which would incline in a direction toward the driven member and outwardly. A second cam supported on the driven member, which in the example shown, is an inclined surface on the end of a sleeve and a pin having a first follower engaging the first cam on the drive member and a second follower on the pin engaging the second cam on the driven member. As the torque on the driving member increases, the inclined wall on the drive member acts as a first cam which exerts a first force on the head of the pin which acts as a cam follower urging the ring on the pin against the end of the sleeve. The ring acts as a second cam follower exerting a second force on the end of the sleeve which opposes the first force. The ring is urged over the inclined end of the sleeve and this second force resiliently deforms the thermoplastic material of the sleeve. The ring is designed to have an outside diameter sufficiently greater than the inside diameter of the sleeve, such that the second force on the sleeve is sufficient to deform the resilient material of the sleeve allowing the ring to enter the inside bore of the sleeve at the point where the torque on the drive member reaches the value at which the coupling was designed to release. The torque release load is divided between the number of pin modules of the coupling and the release value can be decreased by leaving some of the pins in released position. Once the pins move into the bore of the sleeve, they remain there until they are reset by pushing them back into the recess of the drive member. Resetting can be accomplished either manually or automatically by incorporating a push plate and shifting collar actuated by a microswitch or some other switching arrangement that will be obvious to those skilled in the art. Thermoplastic, such as Delrin, Nylon or Polyethylene are self lubricating and can contribute to the repeatability of the release torque required to disconnect the coupling. A microswitch or some other switching arrangement that will be obvious to those skilled in the art could be incorporated for resetting the pins. The modules of FIGS. 2, 4 and 5 have sleeves that can be flipped. One end has a different inside diameter and also by using different sleeves with different inside diameters, the release value of the clutch can be changed.

Figure 2:
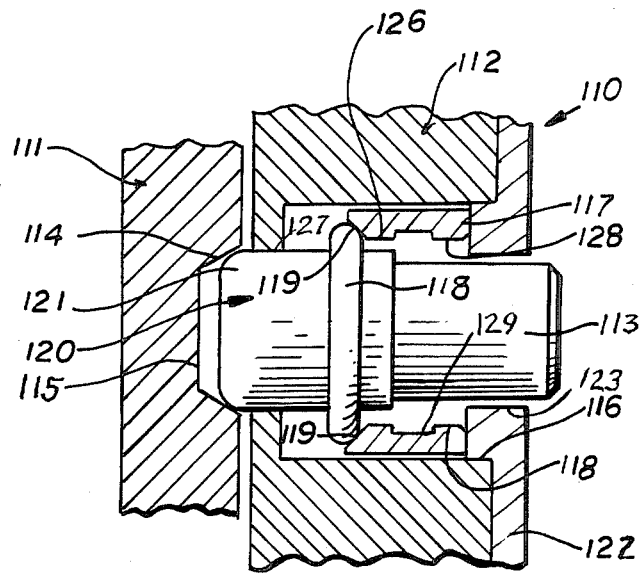
FIG. 2 is a partial view of another embodiment of the invention.
Figure 4:
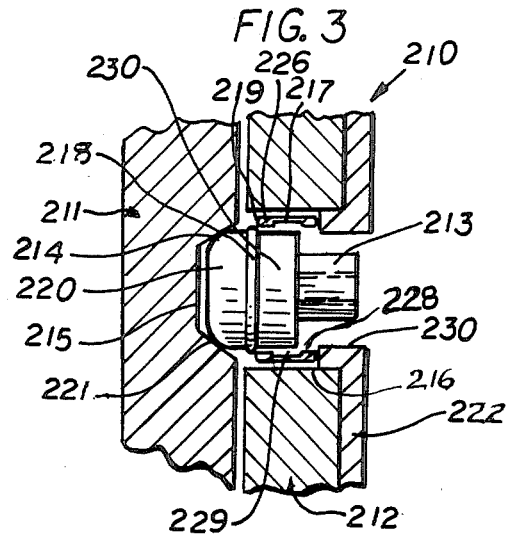
FIG. 4 is a partial view of another embodiment of the invention.
Figure 5:
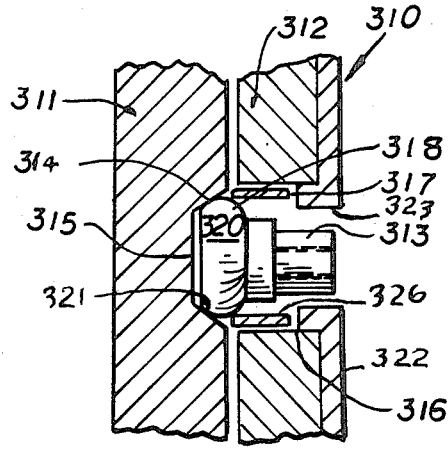
FIG. 5 is a partial view of yet another embodiment of the invention.

The embodiment of FIG. 1 shows the pin 13 having a cylindrical head 20 with curved edge 21, which acts as a first cam follower surface which cooperates with the first cam surface on the recess 15. It is not necessary that the pins have heads on them, but the end of the pin itself could act as the first follower, which would cooperate with the first follower which would cooperate with the first cam surface 14 on the drive member. The ring 18 is integral with the head. The ring 18 engages the inclined end surface 19 of the sleeve 17. The pin enters into the bore 23 of sleeve 17 and is accessible from outside the driven member. In most applications, more than one pin module will be used, spaced circumferentially around the coupling. The sleeve of FIG. 1 is shown integral with flange 22. The sleeves may be made separate from the flanges as shown in FIGS. 2, 4 and 5. These sleeves can be flipped over. One end of the sleeve can have a different inside diameter from the other. Also, by using different sleeves, with different inside diameters, adjustability of the coupling can be accomplished. The head 320 shown in FIG. 5, incorporates the follower ring 18, 118 and 218 as part of the head instead of having a separate ring. Other shapes of heads could be used, for example, the head could be a spherical member or a cylindrical member having a curved second follower surface in a curved first follower surface on the inside with the pin extending outward through the bore in the flange to engage manually or automatically to reset the coupling.

Figure 3:
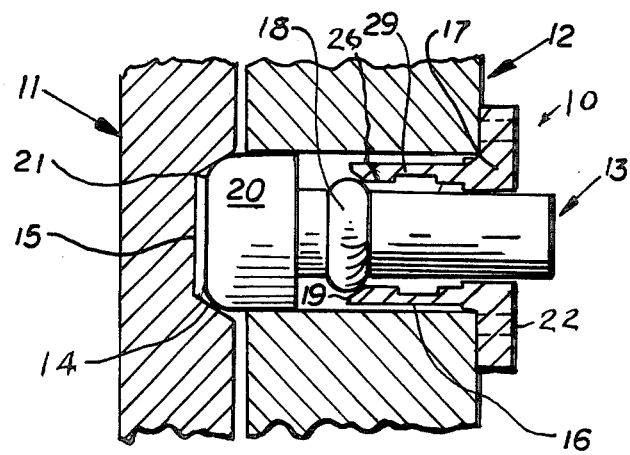
FIG. 3 is a partial view of another embodiment of FIG. 1.

The embodiment shown in FIGS. 1 and 3 show a torque overload release coupling 10 made up of a drive member 11, in the form of a first circular plate, and a driven member 12 in the form of a second circular plate. The drive member 11 may be connected to a drive flange by means of bolts received in threaded bores 24 in the drive member 11 and may be connected by a driven flange connected to the driven member 12 by bolts received in threaded bores 25. Instead of flanges, drive member 11 and driven member 12 could be bored and keyed directly to equipment shafts, for example. The drive member 11 has circumferentially spaced recesses 15 formed in it. These recesses could be formed in separate bushings made of steel or thermoplastic. The recesses 15 have a side wall 14. The shape of the recesses could be conical, cylindrical, spherical or any other suitable shape. Instead of a recess, a leg with a cam surface could be used. Side wall 14 acts as a first cam, which engages the rounded ends 21 of the pins 13. The recesses 15 could contain inserts made of steel or thermoplastic. The necessary cam surfaces could be formed in the inserts or on the outer surfaces of the inserts. The driven member 12 has cylindrical bores 16 which receive the sleeves 17. The cylindrical bores 16 are aligned with the recesses 15 in the drive member 11 when the clutch is engaged. The sleeves 17 are in the form of hollow cylinders and may have flanges 22 fixed to the driven member 12.

Still referring to FIGS. 1 and 3, the pins 13 have elongated bodies which may be cylindrical in shape. Pins 13 make up a first follower 21 that engages with the inclined side wall 14 of recesses 15 the second follower ring 18 and second cam 19 and provide a coupling means between the drive member 11 and the driven member 12. This coupling is disengaged when the predetermined torque load on drive member 11 is reached. At this point, the sleeve is deformed sufficiently to allow ring 18 to enter sleeve 17. The ring 18 is circular in cross section and is formed integral with pin 13 and moves with the pin 13. The ring 18 normally engages the tapered end surface 19 of the sleeve 17. When a torque is transmitted between a drive member 11 and the driven member 12 exceeds a predetermined amount the ring is forced into the sleeve. The ring 18 is of greater outside diameter than the inside diameter of the bore in sleeve 17 and therefore the ring 18 will deform the sleeve 17 in order for the ring 18 to enter the sleeve 17 and move into the cylindrical bore 29 of the sleeve 17 allowing the rounded edge of the enlarged head 20 of the pin to move away from the recesses 15 and therefore release the drive connection of the coupling between the drive member 11 and the driven member 12.

When the ring 18 on each pin, enters the cylindrical bore 29 of the hollow sleeve 17, the rings 18 will be retained in this position and the clutch will remain disengaged until the operator manually resets it by pushing the pins 13 until the enlarged heads 20 enter the recesses 15. The torque required to release the coupling can be adjusted by leaving some of the pins disconnected with their heads 20 out of the recesses 15.

In the embodiment of the invention shown in FIG. 2, I show a drive member 111 and a driven member 112 of a torque release coupling 110. Pins 113 each have an enlarged end or head 120 and a ring 118 integrally attached to the head. The pin 113 has a rounded peripheral curved head 121 which engages the side 114 of the recess 115 and acts as a first cam so that a resultant face on the head 120 of the pins urges the head 120 of the pin out of the recesses 115 when a torque of a predetermined magnitude is exerted between the drive member 111 and the driven member 112. The hollow sleeve 117 is a separate member from flange 122. Sleeve 117 has one end resting against the flange 122 and the other end resting on ring 118. The sleeve 117 is freely received in the bore 116 in driven member 112. The bores 116 are equally spaced from one another corresponding to the recesses 115 in the drive member 111.

It will be seen that the torque exerted on drive member 111 is transferred to the driven member 112 through the tapered first cam surface 114 defining the recesses 115 to pins 113. Each of the rings 118 will be forced by pins 113 against the inclined end surfaces 119 of the sleeve 117 and when the torque increases to the predetermined release value, the rings 118 will be forced into the cylindrical sleeve bore 126 of the bore deforming the sleeves 117 in proportion to the force on the ring 118. This force on sleeves 117 is a reaction of the force on pins 113 exerted by the torque on drive member 111. Since there is no further resistance to the driving torque when the ring enters the sleeve, and since the head 120 of the pin will be outside of the recesses 115 at this point, the coupling between the two members 111 and 112 will be released and the cylindrical sleeve bore 129 will hold the pin 113 in released position until it is moved back into the recesses 115 by an external force. The bore 128 can be of a different size from bore 126. Sleeve 117 can be flipped so that the release torque will be changed.

The embodiment of the invention shown in FIG. 4 shows a drive member 211 of a coupling 210 and a driven member 212. The drive member 211 may be connected to a drive and the driven member 212 may be connected to a load. The flange 222 may be attached to driven member 212 by suitable studs. Circumferentially spaced recesses 215 are formed in the drive member 211 and these recesses have an inclined wall 214 which acts as a cam surface and engages the rounded pin ends 221 which acts as a first cam follower surface. The heads 220 each have the ring 218 integrally attached to it and this ring engages the tapered end 219 of the sleeve 217. The sleeve 217 is freely supported by its cylindrical end 230 and the reduced size end extends out through the hollow 231 of the flange 222. The sleeve can have a different bore at each end and be flipped to provide for a different torque release value.

It will be seen that when a torque is exerted between the drive 211 and driven member 212 that the tapered surface 214 of each recess 215 will engage the ring 218 of each head 220 and a resultant force on the pin end will urge the head 220 out of the recesses 215. The ring 218 and sleeve 217 will be resiliently deformed an amount in proportion to the magnitude of force exerted. One or both of the pin 213 and sleeve 217 is made of a thermoplastic material and the ring will enter the cylindrical bore of the sleeve when the release torque is reached. After the ring 218 has entered the cylindrical bore 229 of the sleeve, it will remain there and the coupling will remain released until the pin is pushed back bringing its head 220 into the recesses 215 by manual force or an automated force by a push plate suitably operated.

In the embodiment of the invention shown in FIG. 5, I show a drive member torque release module. This coupling 310 could be made similar to that shown in the other embodiments of the invention. The drive member 311 has spaced holes that have cam surface 314 similar to the recesses of the other embodiments. The driven member 312 has bores 316 that receive the sleeve 317 which receives the release pin 313, which have enlarged heads 320. The enlarged heads 320 have a curved cam surface 314 on the leading end and a curved surface 318 on the side next to the driven member 312. Thus when a torque is exerted between the drive member 311 and the driven member 312, the pin 313 will be urged outward from the recess 315 against the counterforce from sleeve 317. This counterforce exerted on sleeve 317 will distort the sleeve 317 enough to allow the head 320 of the pin to enter the sleeve 317 when the torque reaches. the predetermined release value. Sleeve 317 will retain the pin in this released position out of the recess 315 until the pin 313 is reset.

The foregoing specification sets forth the invention in its preferred, practical forms but the structure shown is capable of modification within a range of equivalents without departing from the invention which is to be understood is broadly novel as is commensurate with the appended claims.

The embodiment of the invention in which an exclusive property or privilege is claimed are defined as follows:

1. A torque overload release clutch comprising:
   a first rotary member and a second rotary member,
   means supporting said rotary members to rotate about a common axis,
   at least one first cam on said first rotary member,
   at least one pin slidably supported on said second rotary member,
   at least one second cam supported on said second rotary member, a first follower and a second follower connected together and supported on said pin, said first follower member comprising a first end of said pin, said first follower normally engaging said first cam and said second follower normally engaging said second cam, said first cam being adapted to exert a force on said first follower moving said first follower and said second follower relative toward said second cam whereby said second cam is resiliently distorted by said second follower resisting the movement of said followers toward said second cam, the shape and material of said second cam providing for elastic deformation of said second cam providing a reaction force whereby said first follower is moved out of engagement with said first cam when the torque exerted by said first rotary members on said second rotary member reaches a predetermined value, said first follower, said second follower and said second cam being made of thermoplastic material.

2. The torque overload release clutch recited in claim 1 wherein said first follower and said second followers are supported on a pin, said first follower comprises a first end of said pin.

3. The torque overload release clutch recited in claim 1 wherein said first cam comprises a recess having an outwardly curving surface in said first rotary member, said outwardly curving surface facing said second rotary member, said second cam comprises a hollow sleeve member having an inclined end surface, said second follower engages said inclined end surface providing a force resisting the force exerted on said pin by said first cam.

4. The torque overload release clutch recited in claim 3 wherein said second follower comprises a ring on said pin spaced from said first follower member.

5. The torque overload release clutch recited in claim 4 wherein said hollow sleeve has a first end adjacent said second follower and a second end supported on said second rotary member, said first end has an end surface being inclined away from said second follower and toward the center of said sleeve, said inclined surface being engaged by said ring on said pin.

6. The torque overload release clutch recited in claim 5 wherein said hollow sleeve is reversible and adapted to have said second end adjacent said first cam and said first end adjacent stop means of said driven member and the inside diameter of said first end of said sleeve is larger than the inside diameter of said second end.

7. The torque overload release clutch recited in claim 6 wherein said sleeve has a first inwardly sloping cam surface on said first end and a second inwardly sloping cam surface on said second end.

8. The torque overload release clutch recited in claim 5 wherein said sleeve is supported on said second rotary member by an integral flange fixed to said second rotary member.

9. The torque overload release clutch recited in claim 8 wherein said pin is slidably supported in said hollow sleeve, collar means inside said sleeve receiving said ring in said sleeve and frictionally retains said ring when said torque exceeds a predetermined value.

10. The torque overload release clutch recited in claim 1 wherein said first cam member comprises at least one frustoconical shaped recess formed in said first rotary member and having an enlarged end facing toward said second rotary member and said recess is defined by sides inclined relative to the axis of said frustoconical surface and outwardly and toward said second rotary member.

11. The torque overload release clutch recited in claim 10 wherein a plurality of said follower members are provided, each said follower comprises a plurality of said pin disposed on said second rotary member, said pins being disposed in circumferentially spaced relation to one another and spaced from said axis of rotation of said torque overload release clutch, a plurality of said recesses in said first rotary member, said second cam members comprise a plurality of sleeves supported on said second rotary member.

12. The torque overload release clutch recited in claim 11 wherein said second rotary member has a plurality of spaced holes, each said sleeve is received in a said hole, each said sleeve has an outwardly directed flange fixed to said second rotary member.

13. The torque overload release clutch recited in claim 2 wherein said pin comprises a generally cylindrical member having a first rounded end defining said first follower.

14. The torque overload release clutch recited in claim 13 wherein said first rounded end comprises an enlarged end of greater diameter than the part of said pin adjacent said second cam.

15. The torque overload release clutch recited in claim 14 wherein said second follower is a ring on said pin adjacent said second cam.

16. The torque overload release clutch recited in claim 13 wherein said enlarged end has a circular face on the side adjacent said second cam comprising said second follower.

17. The torque overload release clutch recited in claim 13 wherein said second follower is a ring on said enlarged end of said pin spaced from said first cam surface.

18. The torque overload release clutch recited in claim 17 wherein said sleeve is a separate part freely rotatable in said second rotary member.

19. A torque overload release coupling for interconnecting a first rotary member to a second rotary member to rotate about an axis of rotation comprising:

means supporting said first rotary member and said second member in face to face relation to each other to transmit a torsional face therebetween and to release when the torque on said first rotary member reaches a predetermined value comprising:

means to connect said first rotary member to a drive source of power, means to connect said second rotary member to a load to be driven, said first rotary member having a plurality of circumferentially and radially spaced recesses spaced from said axis of rotation, said recesses each having a side wall conforming to a frustoconical shape inclined outwardly from the center of said frustoconical shape and toward said second rotary member, said second rotary member having a plurality of circumferentially and radially spaced bores extending parallel to said axis of rotation, said bores being spaced axially and circumferentially equal to the corresponding spacing of said recesses, a plurality of hollow sleeves and a plurality of pins, said sleeves and pins being made of thermoplastic material, each said sleeve being received in a said bore, each said sleeve having a first end and a second end, said second end having an inclined end surface, the inclined end surface extending toward the central axis of the sleeve and toward the second end of said sleeve, each said pin being telescopically received in a said hollow of a said sleeve, limit means engaging said sleeve restraining movement of said sleeves away from said pins, each said pin having a rounded first end received in a said recess, a second end and an intermediate part, each said pin having a circumferentially extending follower part having a rounded surface thereon fixed to said intermediate part, said rounded surface on each said ring engaging a said surface on a said sleeve end, said ring on each said pin being of greater outside diameter than the inside diameter of said hollow in said sleeve, said first end on each said pin engaging a said frustoconical surface on each said recess and being urged to move out of said recess by torsional force exerted on said first rotary member whereby said ring is forced against said inwardly inclined surface on said sleeve resiliently deforming said sleeve, said rings being adapted to resiliently deform said sleeves in proportion to the torque exerted on said first rotary member and move into said hollow in said sleeves when the torque exerted on said first rotary member reaches a predetermined value thereby disconnecting said pins from said recesses.

20. The torque overload release clutch recited in claim 19 wherein said first end of said pin comprises an enlarged part and said rounded end is formed on said enlarged part.

21. The torque overload release clutch recited in claim 19 wherein said limit means comprises a flange on said sleeve, said flange is attached to said second rotary member and said sleeve is a separate part from said flange, and the end of said sleeve remote from said first torque member engages said flange member.

22. The torque overload release clutch recited in claim 19 wherein said first end of said pin is an enlarged part, said enlarged part is in the form of a generally cylindrical member having a curved front end and a curved second end adjacent said sleeve, said second end engaging said frustoconical surface of said sleeve when said coupling is transmitting torque.

23. The torque overload release clutch recited in claim 22 wherein said second follower part is an outwardly extending ring on said enlarged part between said first end and said second end.

24. The torque overload release clutch recited in claim 19 wherein said spaced bores in said second rotary member have counterbores, said enlarged ends of said pins are slidably received in said counterbores.

25. The torque overload release clutch recited in claim 19 wherein said limit means comprises a flange fixed to said second rotary member, said flange each has an inwardly directed part engaging a said sleeve.

26. The torque overload release clutch recited in claim 25 wherein said flanges have a central hole receiving said pin.

* * * * *